Nov. 10, 1936. P. F. GAFFEY 2,060,006
AUTOMATIC PRESSURE RELEASE VALVE
Original Filed May 23, 1935
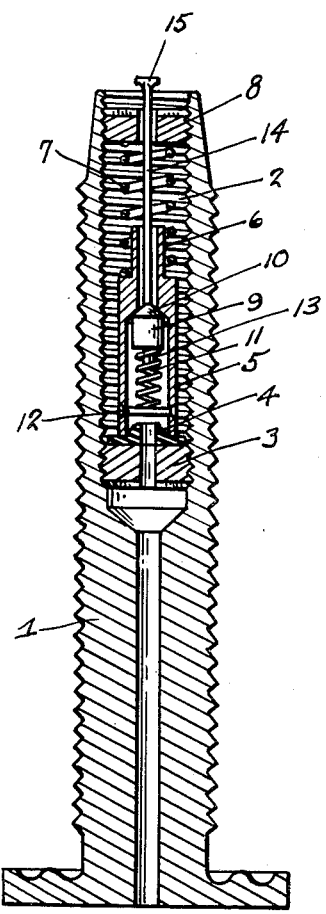
Fig.1.
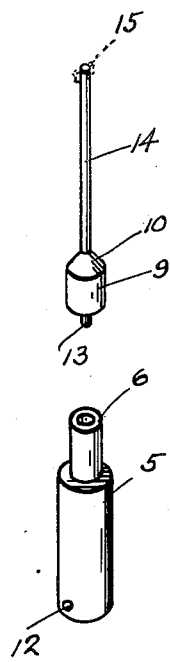
Fig.2.
Fig.3.
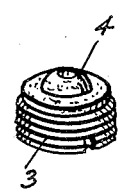
Fig.4.
Inventor
P. F. Gaffey
By Clarence A. O'Brien
Attorney Patented Nov. 10, 1936

2,060,006

UNITED STATES PATENT OFFICE 2,060,006

AUTOMATIC PRESSURE RELEASE VALVE

Patrick F. Gaffey, Hartford, Conn.

Application May 23, 1935, Serial No. 23,091
Renewed September 17, 1936

1 Claim. (Cl. 152—11.5)

This invention relates to an automatic pressure release valve for pneumatic tires and other devices, the general object of the invention being to provide means whereby fluid under pressure can be introduced into a tire or the like and retained therein, the device permitting escape of excessive pressure.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a longitudinal sectional view through a valve stem showing the invention therein.

Figure 2 is a view of the valve member and its stem.

Figure 3 is a view of the casing.

Figure 4 is a view of the plug carrying the valve seat.

In this drawing the numeral 1 indicates the valve stem of a pneumatic tire or other device, this stem containing a longitudinally extending bore, the outer part of which is enlarged and the walls of which are provided with threads as shown at 2. A plug 3 is threaded into the inner end of the enlarged part of the bore and carries a resilient valve seat 4. The valve assembly includes a cylindrical casing 5 the lower end of which is open and is adapted to rest on the seat 4, the upper or outer end of the casing being reduced as shown at 6 and the inner or lower end of the casing is held on the seat 4 by a spring 7 which has one end bearing against the shoulder formed at the juncture of the reduced part 6 with the main part and the other end of the spring bears against a plug 8 threaded in the outer end of the enlarged part of the bore. A valve member 9 is located in the casing 5 and has its upper or outer end of conical shape as shown at 10 for engaging a conical seat in the casing 5 under the action of a spring 11 which bears against the inner end of the member 9 and against a pin 12 extending across the casing. The member 9 is provided with a projection 13 which is encircled by the spring 11 and a stem 14 is connected with the conical end 10 and passes through an opening in the plug 8 and has its outer end flattened as shown at 15.

The spring 7 is suitably attached to the casing 5 so that by removing the plug 8 the entire valve assembly can be removed in one piece.

Air under pressure can be introduced into the tire through the stem 1 and the pressure of this air will push the valve member 9 off its seat so that the air will flow through the casing 5, through aligned holes in the seat 4 and plug 3 and through the stem into the tire. As soon as the chuck or other air supply device is removed from the stem, the valve member 9 will engage the seat and thus hold the air in the tire. However, if too much air is in the tire or if the air expands under the action of heat the excess pressure will force the casing 5 off the seat 4 and then the air will escape around the casing and out through the opening in the plug 8. By adjusting the plug 8 the tension of the spring 7 can be adjusted so that any desired pressure can be held in the tire.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

In a device of the class described, a stem having a bore passing therethrough, the outer portion of the bore being enlarged and internally screw-threaded, a plug threaded in the enlarged part to a point adjacent the inner end thereof, a valve seat on the outer face of the plug, said seat and plug having alined centrally arranged holes therein, an elongated casing of much less diameter than the internal diameter of the enlarged part of the bore, having its inner end open for engaging the seat around the hole, the outer end of the casing being reduced, a plug threaded in the outer end of the large part of the bore and having a hole therein, a spring having its inner end encircling and connected with the reduced part of the casing with its other end bearing against the last mentioned plug, said casing having a valve seat intermediate its ends, a valve in the casing, a spring in the casing for holding the valve on its seat, and a stem connected with the outer end of the valve and passing through the casing and through the outer part of the bore and through the hole in the last mentioned plug.

PATRICK F. GAFFEY.